(12) United States Patent
Kim

(10) Patent No.: US 8,150,978 B2
(45) Date of Patent: Apr. 3, 2012

(54) APPARATUS AND METHOD FOR MANAGING USER INTERFACE

(75) Inventor: Yoon-soo Kim, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 137 days.

(21) Appl. No.: 11/600,878

(22) Filed: Nov. 17, 2006

(65) Prior Publication Data

US 2007/0112958 A1 May 17, 2007

Related U.S. Application Data

(60) Provisional application No. 60/737,375, filed on Nov. 17, 2005.

(30) Foreign Application Priority Data

May 22, 2006 (KR) .................. 10-2006-0045849

(51) Int. Cl.
 G06F 15/16 (2006.01)
 G06F 15/173 (2006.01)
(52) U.S. Cl. .................. 709/228; 709/223
(58) Field of Classification Search .......... 709/223
 See application file for complete search history.

(56) References Cited

U.S. PATENT DOCUMENTS

| | | | | |
|---|---|---|---|---|
| 5,899,990 A * | 5/1999 | Maritzen et al. | ............... | 707/4 |
| 6,049,831 A * | 4/2000 | Gardell et al. | ............... | 709/236 |
| 6,161,136 A * | 12/2000 | Hyndman et al. | ............... | 709/223 |
| 6,356,933 B2 * | 3/2002 | Mitchell et al. | ............... | 709/203 |
| 6,505,341 B1 * | 1/2003 | Harris et al. | ............... | 717/100 |
| 6,757,900 B1 * | 6/2004 | Burd et al. | ............... | 719/316 |
| 7,200,642 B2 * | 4/2007 | Hultgren et al. | ............... | 709/217 |
| 7,260,689 B1 * | 8/2007 | Xu et al. | ............... | 711/147 |
| 7,350,151 B1 * | 3/2008 | Nakajima | ............... | 715/762 |
| 7,424,607 B2 * | 9/2008 | Kanda | ............... | 713/156 |
| 7,500,260 B2 * | 3/2009 | Lupoi et al. | ............... | 725/53 |
| 7,620,908 B2 * | 11/2009 | Klevenz et al. | ............... | 715/781 |
| 2002/0193145 A1 * | 12/2002 | Latvakoski et al. | ............... | 455/557 |
| 2003/0063608 A1 | 4/2003 | Moonen | | |

(Continued)

FOREIGN PATENT DOCUMENTS

JP  2000-259538 A  9/2000

(Continued)

OTHER PUBLICATIONS

Netscape Communication Corp: "Manually Implementing Roaming Access", Dec. 3, 2003, p. 1-4, Version 1,0.

(Continued)

*Primary Examiner* — Minh-Chau Nguyen
(74) *Attorney, Agent, or Firm* — Sughrue Mion, PLLC

(57) ABSTRACT

An apparatus for and method of managing a user interface. The apparatus for managing a user interface including: a packet generation unit that generates a notification packet indicating that one or more remote servers exist on a network, a web server that manages a command for storing a state of a user interface of a predetermined application transmitted through the network or an extract command received as a result of distributing the notification packet, a state storage unit that stores the state of the user interface according to the store command, and a communication unit that transmits the state of a predetermined user interface extracted according to the extract command from among the stored states of the user interface.

21 Claims, 12 Drawing Sheets

U.S. PATENT DOCUMENTS

| | | | |
|---|---|---|---|
| 2003/0137540 A1* | 7/2003 | Klevenz et al. | 345/762 |
| 2004/0024843 A1* | 2/2004 | Smith | 709/219 |
| 2004/0054494 A1* | 3/2004 | El-Khashab | 702/127 |
| 2004/0117804 A1* | 6/2004 | Scahill et al. | 719/320 |
| 2004/0199577 A1* | 10/2004 | Burd et al. | 709/203 |
| 2005/0102522 A1* | 5/2005 | Kanda | 713/176 |
| 2006/0190275 A1* | 8/2006 | Dupree et al. | 705/1 |
| 2007/0074124 A1* | 3/2007 | Farn | 715/760 |
| 2007/0097969 A1* | 5/2007 | Regnier | 370/390 |

FOREIGN PATENT DOCUMENTS

| | | |
|---|---|---|
| JP | 2002-7091 A | 1/2002 |
| JP | 2003244151 A | 8/2003 |
| JP | 2004-62873 A | 2/2004 |
| JP | 2004058341 A | 2/2004 |
| JP | 2005505196 A | 2/2005 |
| JP | 2005-301670 A | 10/2005 |
| JP | 2005293352 A | 10/2005 |
| KR | 2002-0002937 A | 1/2002 |
| KR | 2004-0023633 A | 3/2004 |
| WO | WO 03/017089 A2 | 2/2003 |
| WO | WO 03030452 A2 | 4/2003 |

OTHER PUBLICATIONS

UPNP Forum: "UPnP Device Architecture", Dec. 2, 2003, p. 1-76, version 1.0.1.

Extended European Search Report issued on Dec. 20, 2010 in counterpart European Application No. 10185301.8.

Extended European Search Report issued on Dec. 20, 2010 in counterpart European Application No. 10185341.4.

Japanese Office Action issued in corresponding Application No. 2006-303991 on Sep. 13, 2011.

* cited by examiner

POST /SAVE? _name_ = *NameForToBeSavedStates*

HOST: *hostname:hostport*

Content-Length: *bytes in body*

Content-Type: *application/x-www-cea2014-states*

GET /RESTORE? _name_ = *NameForSavedStates*

HOST: *hostname:hostport*

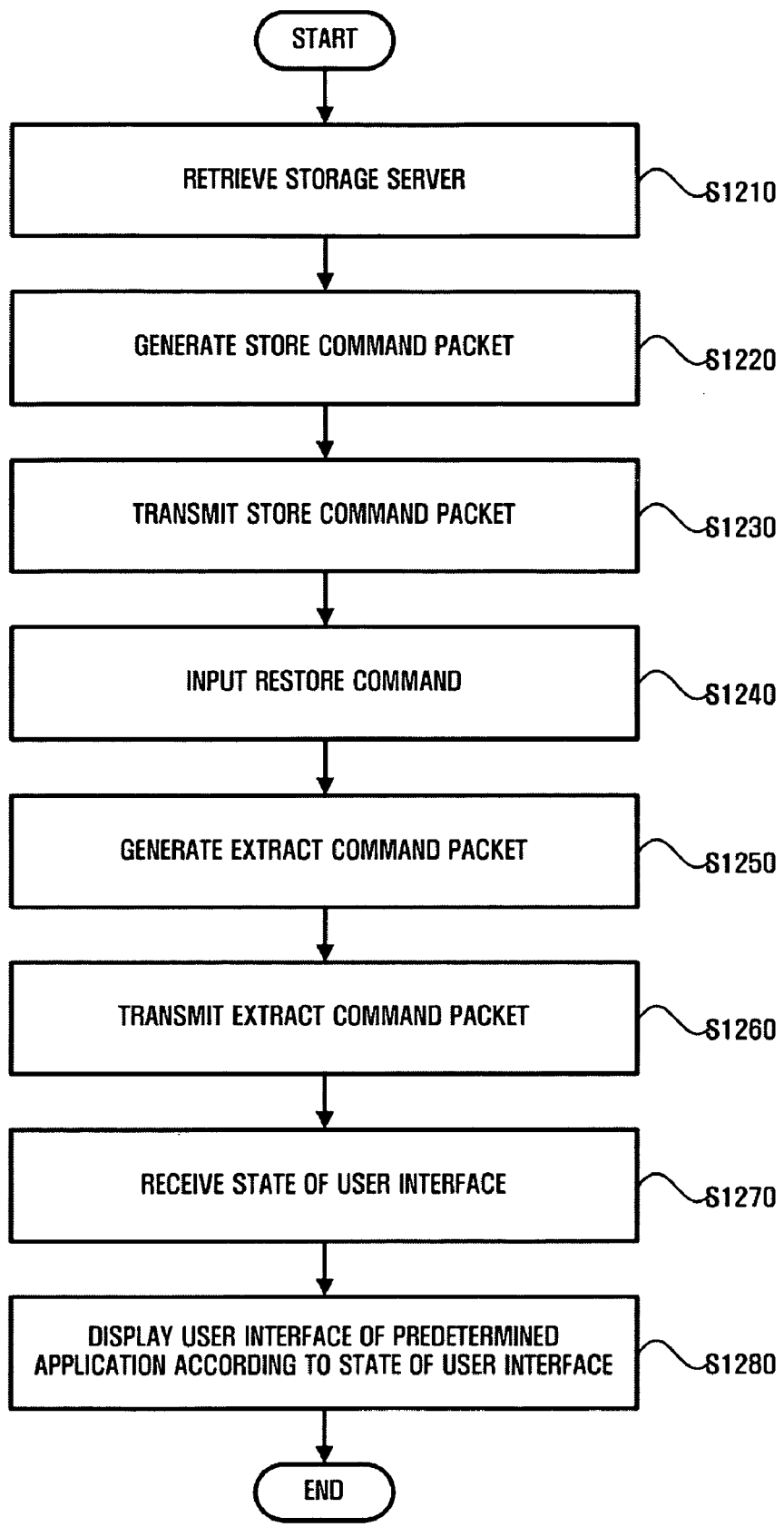

APPARATUS AND METHOD FOR MANAGING USER INTERFACE

CROSS-REFERENCE TO RELATED APPLICATION

This application claims priority from Korean Patent Application No. 10-2006-0045849 filed on May 22, 2006 in the Korean Intellectual Property Office, and U.S. Provisional Patent Application No. 60/737,375 filed on Nov. 17, 2005 in the United States Patent and Trademark Office, the disclosures of which are incorporated herein by reference in their entirety.

BACKGROUND OF THE INVENTION

1. Field of the Invention

The apparatuses and methods consistent with the present invention relate to managing a user interface, and more particularly, to managing a user interface in which a state of a user interface of an application provided by a server on a network is managed using a hypertext markup language (HTML) and a hypertext transfer protocol (HTTP).

2. Description of the Related Art

Technologies that provide an application by a remote server include Microsoft's remote desktop protocol (RDP) and Intel's extended remote protocol. These remote technologies are based on a binary bitmap transmission protocol, and when providing an application they have a drawback of requiring a large network bandwidth. In particular, when a user interface of a remote application uses audio and/or video streaming, the required bandwidth of a network becomes larger.

Meanwhile, a user who performs a job using an application provided by a server through a predetermined client may later request a consistent user interface when the user performs a job using the application through another client. That is, the user wants the same user interface, which was used for a job that was finished through a first client, to be displayed through a second client.

FIG. 1 illustrates a conventional system providing a remote application in a case where a client has been changed. Referring to FIG. 1, in a universal plug and play (UPnP) environment, the system is composed of a remote control point 10, a remote server 20, a first remote client 31 and a second remote client 32.

Networking operations of the UPnP environment include addressing, discovery, description, control, eventing, and presentation. The remote control point 10 confirms that a connection with the first remote client 31 is operating. Then, the remote control point 10 makes the remote server 20 maintain the state of a user interface for the currently operating connection for a predetermined time and makes the remote server 20 store the state.

Then, the remote control point 10 terminates the connection between the remote server 20 and the first remote client 31, establishes a connection between the remote server 20 and the second remote client 32, and then commands the remote server 20 to provide the stored user interface to the second remote client 32.

However, among the various states of the user interface, in addition to the user interface states managed by the remote server 20, there are also states managed by the remote clients 31 and 32. For example, client cookies of a web browser, a form input, and an audio/video object are all managed by remote clients. Accordingly, the states of the user interface stored in the remote server 20 according to the conventional technology do not include the states managed by the remote clients 31 and 32.

When the remote server 20 does not have a storage unit, there is no method of storing and restoring the states of a user interface. Thus, there is a need to solve this problem.

SUMMARY OF THE INVENTION

According to an aspect of the present invention, there is provided an apparatus for managing a user interface including: a packet generation unit that generates a notification packet indicating that one or more remote servers exist on a network; a web server that manages a command for storing a state of a user interface of a predetermined application transmitted through the network or an extract command received as a result of distributing the notification packet; a state storage unit that stores the state of the user interface according to the store command; and a communication unit that transmits the state of a predetermined user interface extracted according to the extract command from among the stored states of the user interface.

According to another aspect of the present invention, there is provided an apparatus for displaying a user interface including: a server retrieval unit that searches a server storing a state of a user interface in relation to a provided application, a state management request unit that generates a packet for a store command or an extract command in relation to the state of the user interface according to the searching result, a communication unit that transmits the state of the user interface or the packet, and a web browser that displays a predetermined user interface received in response to the transmission of the packet for the extract command.

According to still another aspect of the present invention, there is provided a method of managing a user interface including: generating a notification packet indicating that one or more remote servers exist on a network, managing a store command of a state of a user interface of a predetermined application transmitted through the network or an extract command received as a result of distributing the notification packet, storing the state of the user interface according to the store command, and transmitting the state of a predetermined user interface extracted according to the extract command from among the stored states of the user interface.

According to a further aspect of the present invention, there is provided a method of displaying a user interface including searching a server storing a state of a user interface in relation to a provided application, generating a packet for a store command or an extract command in relation to the state of the user interface according to the result of the searching, transmitting the state of the user interface or the packet, and displaying a predetermined user interface received in response to the transmission of the packet for the extract command.

BRIEF DESCRIPTION OF THE DRAWINGS

The above and other features and advantages of the present invention will become more apparent by describing in detail an exemplary embodiment thereof with reference to the attached drawings in which:

FIGS. 7A and 7B illustrate HTML codes in relation to a store command packet and an extract command packet, respectively, according to an exemplary embodiment of the present invention;

FIG. 12 is a flowchart illustrating a process of receiving an application according to an exemplary embodiment of the present invention.

DETAILED DESCRIPTION OF THE EXEMPLARY EMBODIMENTS

Figure 1:
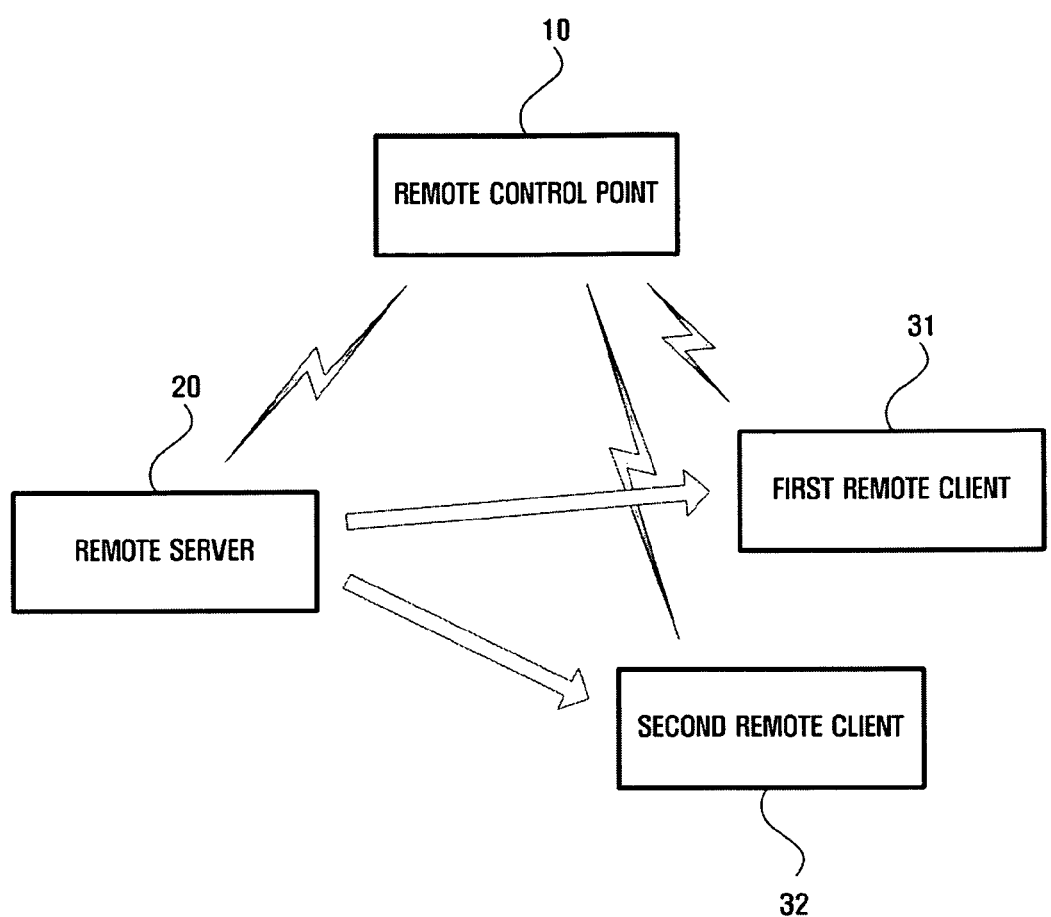
FIG. 1 illustrates a conventional system providing a remote application in a case where a client has been changed.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention will now be described more fully with reference to the accompanying drawings, in which exemplary embodiments of the invention are shown.

Figure 2:
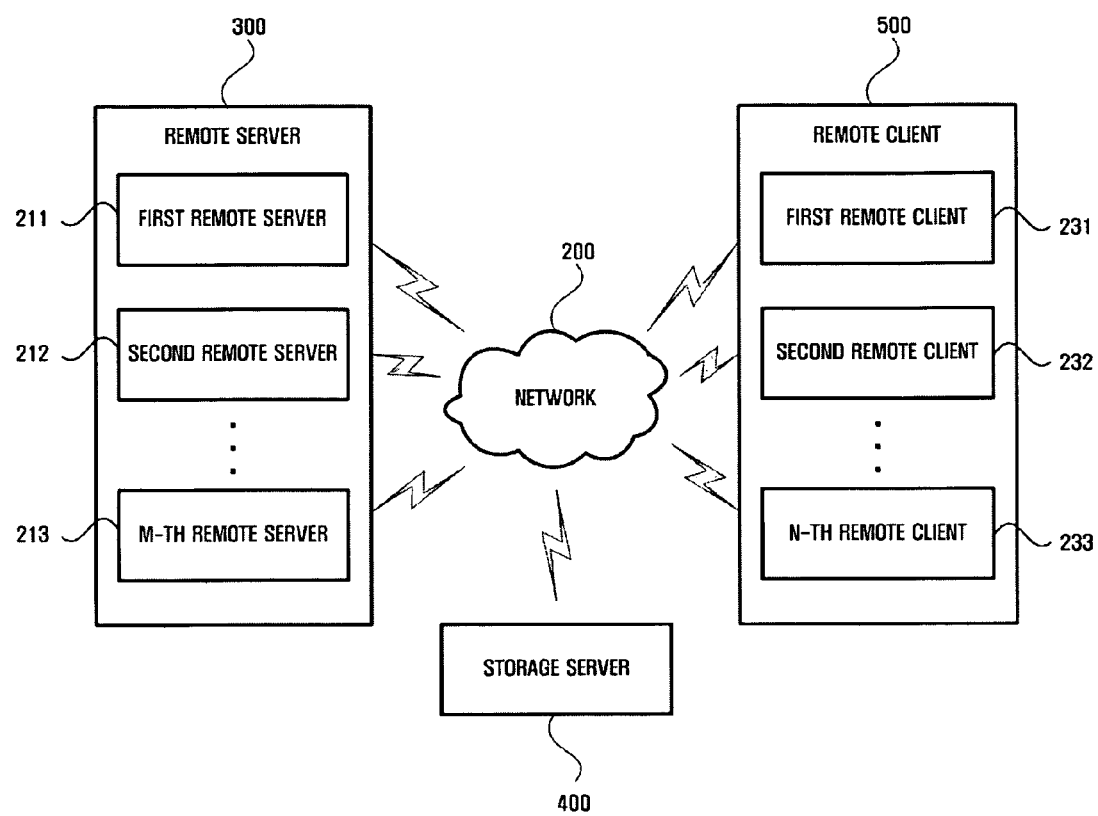
FIG. 2 illustrates a system for managing a user interface according to an exemplary embodiment of the present invention.

FIG. 2 illustrates a system for managing a user interface according to an exemplary embodiment of the present invention. Referring to FIG. 2, the system is composed of a remote server 300, a storage server 400, a remote client 500 and a network 200.

One or more remote servers 300 may exist on the network 200. The remote server 300 provides an application to the remote client 500. To achieve this, each of remote servers 211 through 213 can have a web server and can periodically transmit a notification packet indicating that it is connected to the network 200.

Here, the application may include an application program that can be executed in the remote client 500 and may also include a web page.

Also, the remote server 300 can transmit its state according to a request of the remote client 500. The state of the remote server 300 may include a uniform resource locator (URL) of an application being provided. The network 200 may be a wired network or a wireless network. The network 200 transfers data between respective devices using the HTTP.

The remote client 500 displays an application provided by the remote server 300. To achieve this, the remote client 500 may include a web browser. In order to receive an application, first, the remote client 500 searches for a remote server 300 on the network 200. The searching for the remote server 300 can be performed by receiving a notification packet. The remote client 500 communicates with the remote server 300 by referring to the address of the remote server 300 included in the notification packet and requests a desired application.

While receiving an application through this process, the remote client 500 can stop reception of the application, and the application being provided can be provided again later. To achieve this, the remote client 200 transmits the state of a user interface in relation to the application at the time when the reception is stopped so that the state can be stored.

Like the remote server 300, the storage server 400 also periodically transmits a notification packet indicating that the storage server 400 is connected to the network 200, and to achieve this, the storage server may have a web server. The remote client 500 receiving the notification packet of the storage server 400 communicates with the storage server 400 by referring to the address of the storage server 400 included in the notification packet, and transmits the state of a user interface in relation to the application being provided to the remote client 500 to the storage server 400.

Here, the state of the user interface includes the state of the remote server 300 and the state of the remote client 500 in relation to the application. The state of the remote server 300 includes information on the URL of the application as described above, and the state of the remote client 500 includes web browser cookies, a form input, and an audio/video object.

The state of the user interface can be provided to the storage server 400 in an HTML format and may relate to an application provided by one or more remote servers 300.

For example, a first remote client 231 can receive an application from the first remote server 211 and the second remote server 212 at the same time. At this time, the state of the user interface that the first remote client 231 wants to store includes the state of the first remote server 211, the state of the second remote server 212, and cookies of a web browser of the first remote client 231, a form input and an audio/video object.

Meanwhile, a user who operates the application provided by one or more remote servers 300, through the first remote client 231, can stop the operation and store the state of the user interface in the storage server 400, and then, can continue to operate the application through a second remote client 232.

In this case, the second remote client 232 receives a notification packet transmitted by the storage server 400, confirms that the storage server 400 exists on the network 200, and then, requests the storage server 400 to transmit the state of the user interface.

According to the request of the remote client 500, the storage server 400 transmits the state of the user interface, which may include the state of the user interface in relation to a plurality of applications provided by a plurality of remote servers 300.

The second remote client 232, which receives the state of the user interface in relation to the plurality of applications, can receive the plurality of applications included in the state of the user interface at the same time or can receive one or more applications selected by the user.

Figure 3:
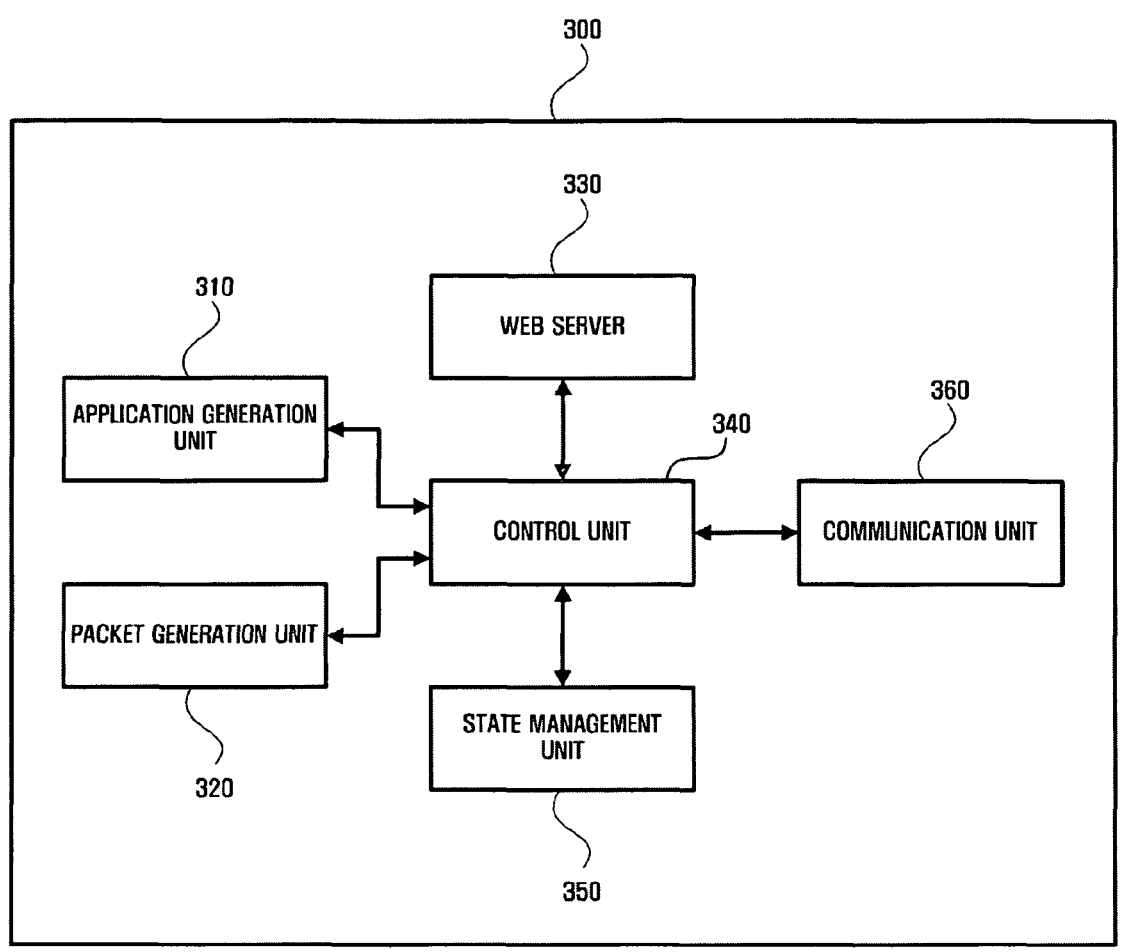
FIG. 3 is a block diagram illustrating a remote server providing an application, according to an exemplary embodiment of the present invention.

FIG. 3 is a block diagram illustrating a remote server 300 providing an application, according to an exemplary embodiment of the present invention. Referring to FIG. 3, the remote server 300 is composed of an application generation unit 310, a packet generation unit 320, a web server 330, a control unit 340, a state management unit 350, and a communication unit 360.

The application generation unit 310 generates an application to be provided to the remote client 500. Here, the application may include an application program that can be executed in the remote client 500 and may also include a web page.

The packet generation unit 320 generates a notification packet indicating that the remote server 300 exists on a network. The notification packet includes an address of the remote server 300. By referring to this address, the remote client 500 can communicate with the remote server 300. The notification packet can be transmitted periodically through the communication unit 360.

The web server 330 provides an application to the remote client 500 by using a client/server model and the HTTP. Apache, Internet Information Server (IIS), Enterprise Server, or Lotus Domino Server can be used as the web server 330 according to an operating system operating on the remote server 300.

The state management unit 350 provides to the remote client 500 the state of the user interface in relation to an application being provided. Here, the states managed by the state management unit 350 indicate the states of only the remote server 300 and can include a URL of an application.

If a request from the remote client 500 to transmit the state of a user interface is received, the state management unit 350 confirms the state of the user interface in relation to the application currently being provided and, then, transmits the confirmation result through the communication unit 360.

The communication unit 360 communicates with the remote client 500, transmitting an application or the states of the user interface and receiving a packet requesting the state of the user interface.

The method of communication between the communication unit 360 and the remote client 500 can be a wired communication method, such as Ethernet, universal serial bus (USB), IEEE 1394, serial communication and parallel communication methods, and can also be a wireless communication method, such as, infrared communication, Bluetooth, Home radio frequency (RF), and wireless LAN methods.

Packets transmitted and received through the communication unit 360 may have an HTML format. As such, loads to a network can be reduced compared to a method providing a user interface as image data.

The control unit 340 determines the type of packet received through the communication unit 360 and performs overall control of the application generation unit 310, the packet generation unit 320, the web server 330, the state management unit 350, the communication unit 360, and the remote server 300.

Figure 4:
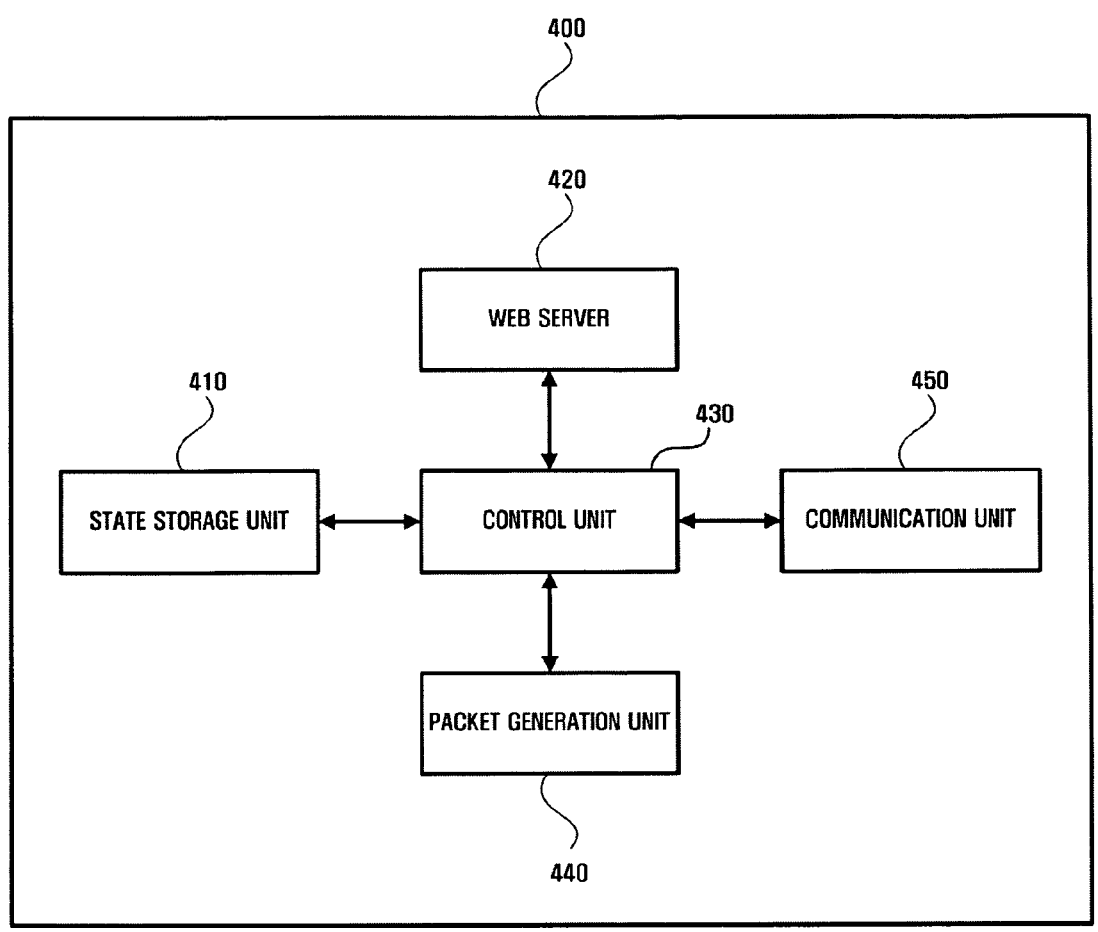
FIG. 4 is a block diagram illustrating a storage server managing the state of a user interface, according to an exemplary embodiment of the present invention.

FIG. 4 is a block diagram illustrating a storage server managing the state of a user interface according to an exemplary embodiment of the present invention. Referring to FIG. 4, the storage server 400 is composed of a state storage unit 410, a web server 420, a control unit 430, a packet generation unit 440, and a communication unit 450.

The state storage unit 410 stores the state of a user interface received from the remote client 500. Here, the state of the user interface may include cookies of a web browser of the remote client 500, a form input, an audio/video object, and the state of the remote server 300 providing an application. The state of the remote server 300 may include the state of one or more remote servers 300.

When the state of a user interface is stored, the state of each user interface can be given a predetermined name. Here, the name may be input directly by the user of the remote client 500, or may be generated by automatically combining a time when the state is stored, the name of an application, the name of a remote server, or an address of a remote server.

The state storage unit 410 includes a module capable of inputting and outputting information, such as a hard disc, a flash memory, a compact flash (CF) card, a secure digital (SD) card, a smart media (SM) card, a multimedia card (MMC), or a memory stick.

The web server 420 provides to the remote client 500 an interface for storing the state of a user interface by using a client/server model and the HTTP. That is, the user of the remote client 500 can store and extract the state of the user interface through the interface provided by the web server 420.

The packet generation unit 440 generates a notification packet indicating that the storage server 400 exists on a network. The notification packet includes an address of the storage server 400. By referring to the address, the remote client 500 can communicate with the storage server 400. The notification packet can be periodically transmitted through the communication unit 450.

The communication unit 450 transmits and receives a notification packet, a store command, an extract command, or the state of a user interface through communication with the remote client 500. The method of communication between the communication unit 450 and the remote client 500 can be a wired communication method, such as Ethernet, universal serial bus (USB), IEEE 1394, serial communication and parallel communication methods, and can also be a wireless communication method, such as, infrared communication, Bluetooth, Home radio frequency (RF), and wireless LAN methods. Packets transmitted and received through the communication unit 450 may have an HTML format.

The control unit 430 determines the type of packet received through the communication unit 450, and performs overall control of the state storage unit 410, the web server 420, the packet generation unit 440, the communication unit 450, and the storage server 400.

Meanwhile, the remote server 300 and the storage server 400 may be disposed in one apparatus (hereinafter referred to as an integrated server). The integrated server provides an application to the remote client 500, and can store the state of the user interface according to a request by the remote client 500.

The state of the user interface to be stored in the integrated server can include the state of a user interface in relation to an application provided by another remote server, as well as the state of the user interface in relation to an application provided by the integrated server.

Figure 5:
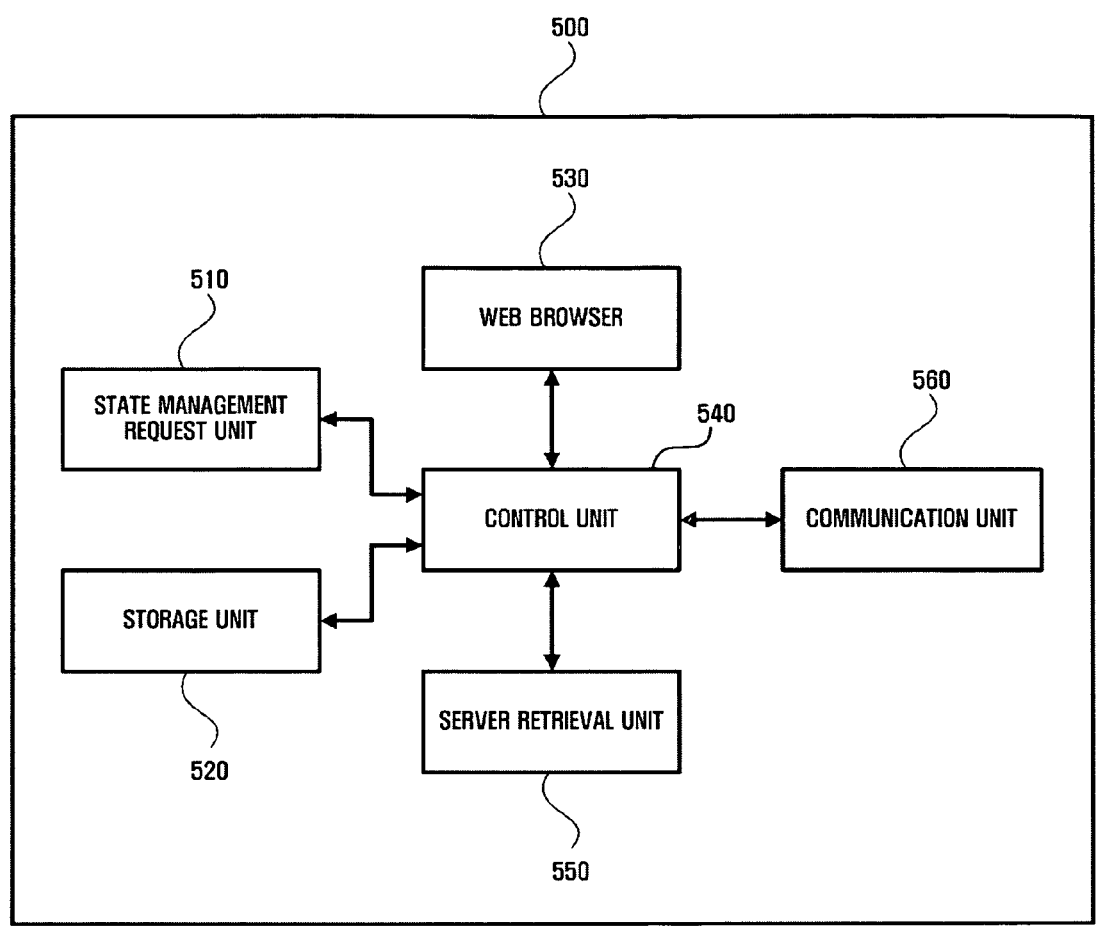
FIG. 5 is a block diagram illustrating a remote client receiving an application, according to an exemplary embodiment of the present invention.

FIG. 5 is a block diagram illustrating a remote client receiving an application according to an exemplary embodiment of the present invention. Referring to FIG. 5, the remote client 500 is composed of a state management request unit 510, a storage unit 520, a web browser 530, a control unit 540, a server retrieval unit 550 and a communication unit 560.

The state management request unit 510 generates a request packet to request the state of the remote server 300, a packet for a store command to store the state of a user interface (hereinafter referred to as a store command packet), and a packet for an extract command to extract the state of a user interface (hereinafter referred to as an extract command packet).

Each packet is transmitted through the communication unit 560, and the request packet is transmitted to the remote server 300, and the store command packet and the extract command packet are transmitted to the storage server 400.

The web browser 530 displays an application provided by the remote server 300 or displays a user interface received from the storage server 400 in response to an extract command packet.

Here, the web browser 530 displays names in relation to the states of a plurality of user interfaces provided by the storage server 400. At this time, the user selects one of the displayed names so that the user can operate a desired application.

The server retrieval unit 550 searches for the remote server 300 or the storage server 400. The remote server 300 and the storage server 400 periodically distribute notification packets to indicate that they are connected to a network. The server retrieval unit 550 analyzes a notification packet received through the communication unit 560 and determines whether the remote server 300 or the storage server 400 exists on the network.

If it is determined by the server retrieval unit 550 that the remote server 300 or the storage server 400 exists on the network, an address of the remote server 300 or the storage server 400 included in the notification packet is transferred to the control unit 540.

By referring to the address transferred by the server retrieval unit 550, the control unit 540 enables the web browser 530 and the web server 330 of the remote server 300 or the web server 420 of the storage server 400 to communicate with each other.

Also, the control unit 540 performs overall control of the state management request unit 510, the storage unit 520, the web browser 530, the server retrieval unit 550, the communication unit 560, and the remote client 500.

The storage unit 520 stores cache information on peripheral devices forming a network. The addresses of the remote server 300 and the storage server 400 retrieved by the server retrieval unit 510 may be included in the cache information. Also, in case of the storage server 400, an additional flag may be added and stored. The storage unit 520 may comprise a hard disk, a flash memory, a CF card, a SD card, a SM card, a MMC, a memory stick, and other modules capable of inputting and outputting data.

The communication unit 560 transmits and receives an application, a request packet, a store command packet, and an extract command packet, through communication with the remote server 300 or the storage server 400.

Here, the communication unit 560 can transmit and receive an application, the state of a user interface, or a packet, by using the HTTP, and the state of the user interface and the packet may be formed using the HTML.

Figure 6:
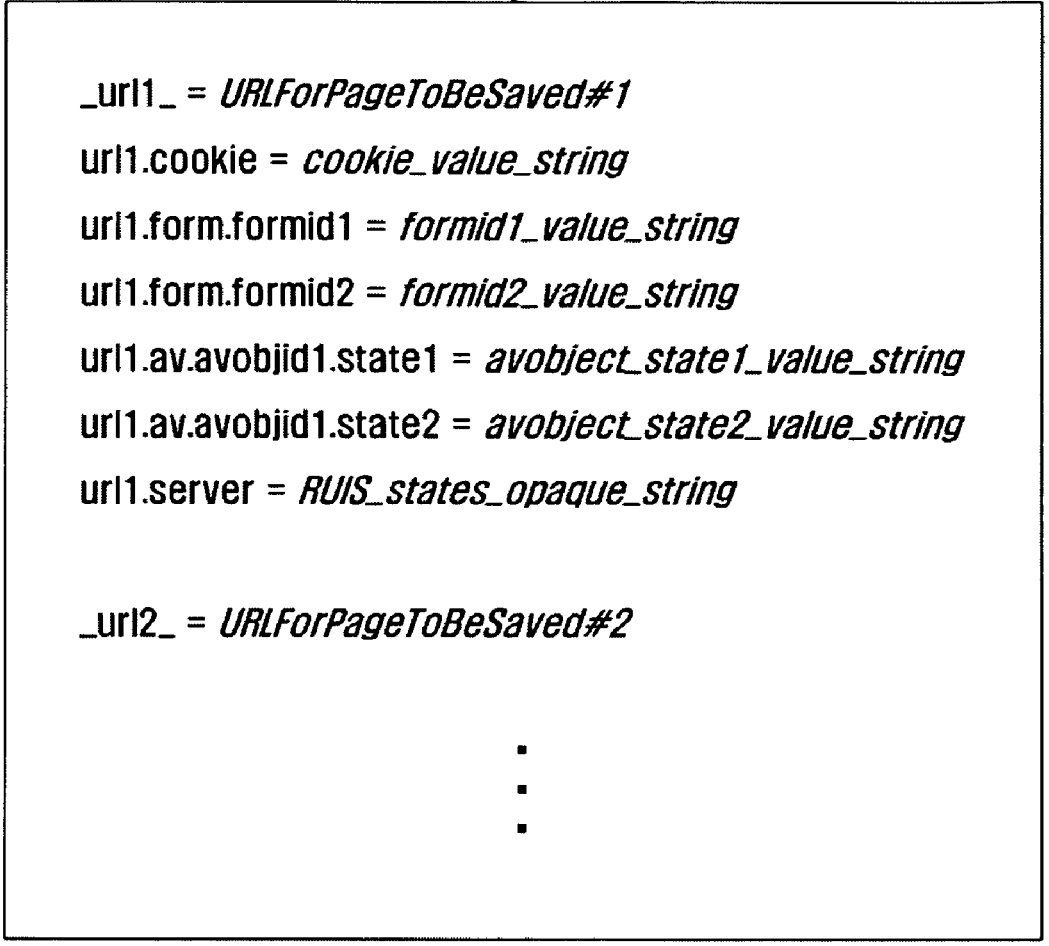
FIG. 6 illustrates a hypertext markup language (HTML) code in relation to the state of a user interface, according to an exemplary embodiment of the present invention.

FIG. 6 illustrates a hypertext markup language (HTML) code in relation to the state of a user interface according to an exemplary embodiment of the present invention.

Referring to FIG. 6, the HTML code 600 is generated by a remote client and transmitted to a storage server.

As described above, the state of the user interface may include a URL of an application, cookies of a web browser of a remote client, a form input, an audio/video object, and an address of a remote server. The HTML code 600 may include the states of a plurality of user interfaces of an application.

In FIG. 6, in _url#_, URLs in relation to one or more applications are input. For example, in _url1_, a URL (URL-ForPageToBeSaved#1) of a first application can be input, and in _url2_, a URL (URLForPageToBeSaved#2) of a second application can be input, The state of each user interface may include one cookie (url#.cookie), one or more form inputs (url#.form.formid#), an audio/video object (url.av.avobjid#.state#) and the state of a remote server (url#.server).

In the form input,formid# indicates a unique number of a form input, and the type is determined according to the type of an input value (formid#_value_string). For example, if the type of an input value is text, the type of the form input becomes text.

In an audio/video object, avobjid# indicates a unique number of an audio/video object, and state# indicates URL or reproduction information in relation to an audio/video object. For example, if state# indicates a URL of an audio/video object, it can be expressed as url.av.avobjid.data=http://192.168.0./videos/efg.mpg. If state# indicates reproduction information of an audio/video object, it can be expressed as url.av.avobjid.playPosition=93847. Here, playPosition indicates a predetermined reproduction position when the audio/video object is reproduced.

The state of a remote server requested from the remote server by a remote client is input as the state of a remote server. For example, when a remote clients is connected to a remote server and is receiving electronic program guide (EPG) information as an application, the remote server can respond with a state, progid:123/recordStartTime:09\:00 AM/step:3. Accordingly, it can be expressed as url.server=progid:123/recordStartTime:09\:00 AM/step:3.

FIGS. 7A and 7B illustrate HTML codes in relation to a store command packet 700A and an extract command packet 700B, respectively, according to an exemplary embodiment of the present invention. The store command packet 700A includes the name of a user interface (/SAVE?_name_), the name of a remote client (HOST), the size of a packet (Content_Length) and the type of an HTML document (Content_Type), and includes the HTML code in relation to the state of the user interface described above with reference to FIG. 6.

Here, the name of the user interface may be input directly by the user of the remote client 500, or may be generated by automatically combining a time when the name is stored, the name of an application, the name of a remote server, or an address of a remote server.

At this time, if the name of a user interface included in the store command packet 700A is the same as the name of a user interface already stored in the storage server 400, a different name may be specified by the user or an arbitrary name may be specified by the storage server 400. For example, by adding a predetermined number to the name of the received user interface, the storage server 400 can distinguish the name from the already stored name of the user interface.

Meanwhile, the remote client 500 may transmit a store command packet 700A to store the states of a plurality of user interfaces in relation to respective applications provided by a plurality of remote servers 300. Accordingly, the store command packet 700A may include states of the plurality of user interfaces.

As illustrated in FIG. 7B, the extract command packet 700B includes the name (/RESTORE?_name) of a user interface desired to be extracted and an HTML code in relation to the name (HOST) of a remote client.

The storage server 400 receiving the extract command packet 700B extracts a state having the name of the user interface corresponding to the packet 700B among the states of user interfaces, and transmits the state to the remote client 500.

Figure 8:
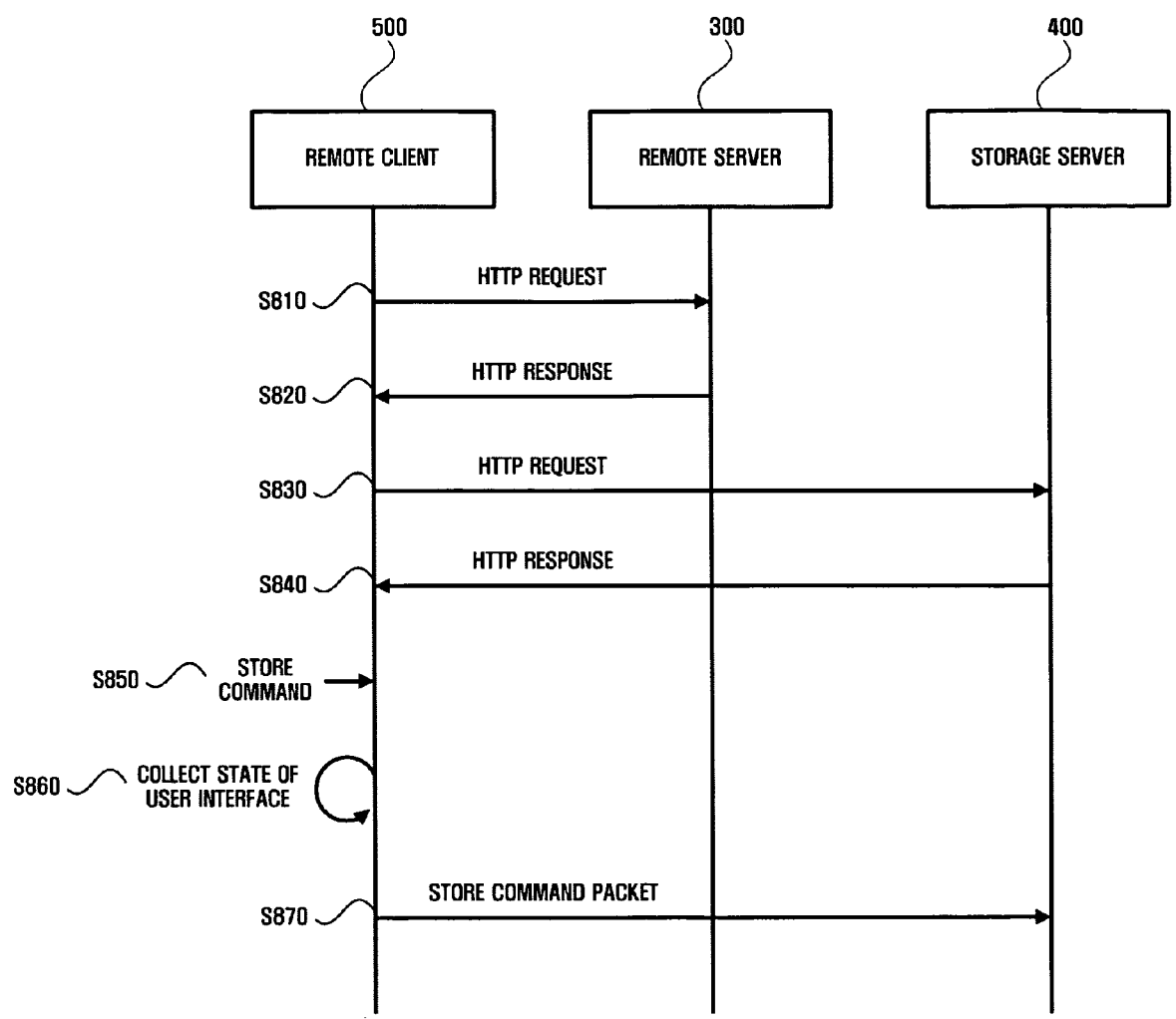
FIG. 8 is a flowchart illustrating a process of searching a storage server according to an exemplary embodiment of the present invention.

FIG. 8 is a flowchart illustrating a process of searching a storage server according to an exemplary embodiment of the present invention.

A remote client 500 receiving a notification packet from a remote server 300 or a storage server 400 transmits an HTTP request packet (HTTP Request) to the remote server 300 or the storage server 400, by referring to the address included in the notification packet.

First, when the HTTP request packet is transmitted to the remote server 300 having no storage unit in operation S810, the remote server 300 transmits an HTTP response packet to the remote client 500 in operation S820. Here, the header of the HTTP response packet does not include a flag indicating that the remote server 300 has a storage unit.

Accordingly, in operation 830, if the remote client 500 transmits an HTTP request packet to the storage server 400, which is another server existing on the network, the storage serer 400 transmits an HTTP response packet to the remote client 500 in operation S840. Here, the header of the HTTP response packet includes a flag indicating that the storage server 400 has a storage unit. For example, a flag such as the one below can be inserted into the header:

RUIS-Capabilities: StateStorage

Here, RUIS indicates a remote user interface server such as the remote server 300 and the storage server 400, having web servers 330 and 420, respectively, and an integrated server.

Then, if the user inputs a store command in operation S850, the remote client 500 collects the state of a user interface in relation to an application being currently operated in operation S860. That is, by requesting the URL of the application from the remote server 300 providing the application, the remote client 500 receives the URL of the application, and confirms cookies of a web browser, a form input and an audio/video object.

Then, in operation S870, the remote client 500 transmits to the storage server 400 a store command packet 700A including the name of a user interface, the name of a remote client, the size of a packet, the type of an HTML document, and an HTML code in relation to the collected state of the user interface. The storage server 400 stores the HTML code in relation to the state of the user interface included in the store command packet 700A.

Figure 9:
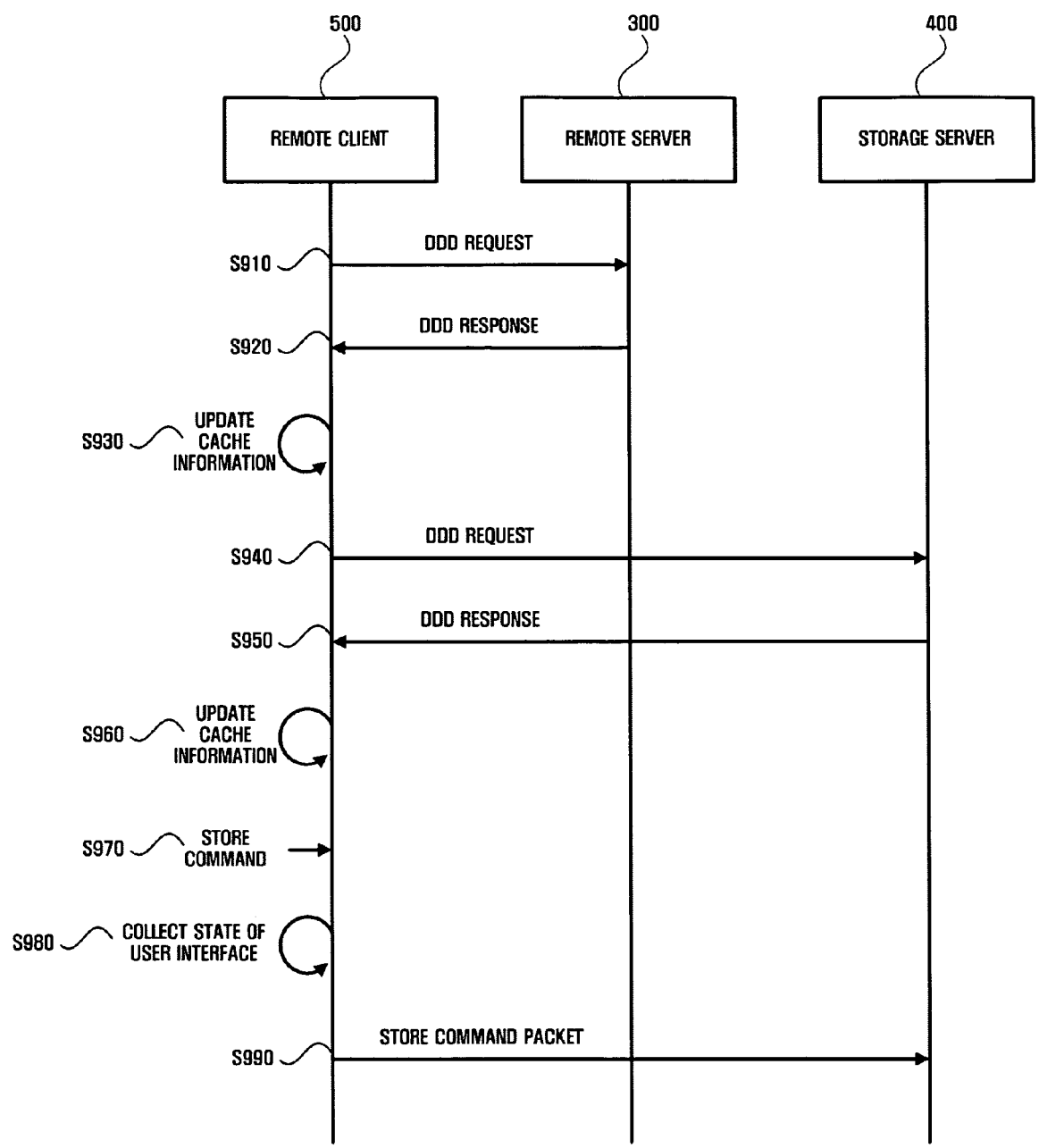
FIG. 9 is a flowchart illustrating a process of searching a storage server in a universal plug and play (UPNP) environment according to an exemplary embodiment of the present invention.

FIG. 9 is a flowchart illustrating a process of searching a storage server in a universal plug and play (UPnP) environment according to an exemplary embodiment of the present invention.

The server retrieval unit 550 of the remote controller 500 performs the role of a control point of the UPNP, and the control unit 340 or 430 and the packet generation unit 320 or 440 of the remote server 300 or the storage server 400 perform the role of a controlled device. By doing so, UPNP communication between the remote client 500 and the remote server 300 or the storage server 400 can be performed.

The remote client 500 receives a notification packet through a discovery step with the remote server 300 or the storage server 400. Then, by referring to an address included in the notification packet, the remote client 500 transmits a device description document (DDD) request packet to the remote server 300 or the storage server 400 in an HTTM GET method.

First, when the DDD request packet is transmitted to the remote server 300 having no storage unit in operation S910, the remote server 300 transmits a DDD response packet to the remote client 500 in operation S920. Here, the header of the DDD response packet does not include information indicating that the remote server 300 has a storage unit.

Accordingly, the remote client 500 analyzes the received DDD response packet, and updates cache information on peripherals forming the network in operation S930. Then, after storing the updated cache in the storage unit 520, the remote client 500 transmits a DDD request packet to the storage server 400, which is another server existing on the network, in operation S940.

The storage server 400 receiving the DDD request packet, transmits a DDD response packet to the remote client 500 in operation S950. Here, the DDD response packet includes information indicating that the storage server 400 has a storage unit. For example, information such as the information shown below can be inserted into the DDD response packet.

<RUIS-Capabilities>StateStorage</RUIS-Capabilities>

Accordingly, the remote client 500 analyzes the received DDD response packet, updates cache information in operation S960, and stores the updated cache information in the storage unit 520. Transmission of the DDD request packet and analysis of the DDD response packet are performed in relation to all devices existing on the network. Accordingly, information on a plurality of storage servers 400 having storage units can be included in the cache information.

Then, if the user inputs a store command in operation S970, the remote client 500 collects the state of a user interface in relation to an application being currently operated in operation S980.

Then, after selecting one in the list of storage servers 400 included in the cache information, the remote client 500 transmits to the selected storage server 400 a store command packet 700A including the state of the user interface in operation S990. Here, the selection of the storage server 400 can be performed by the user.

Figure 10:
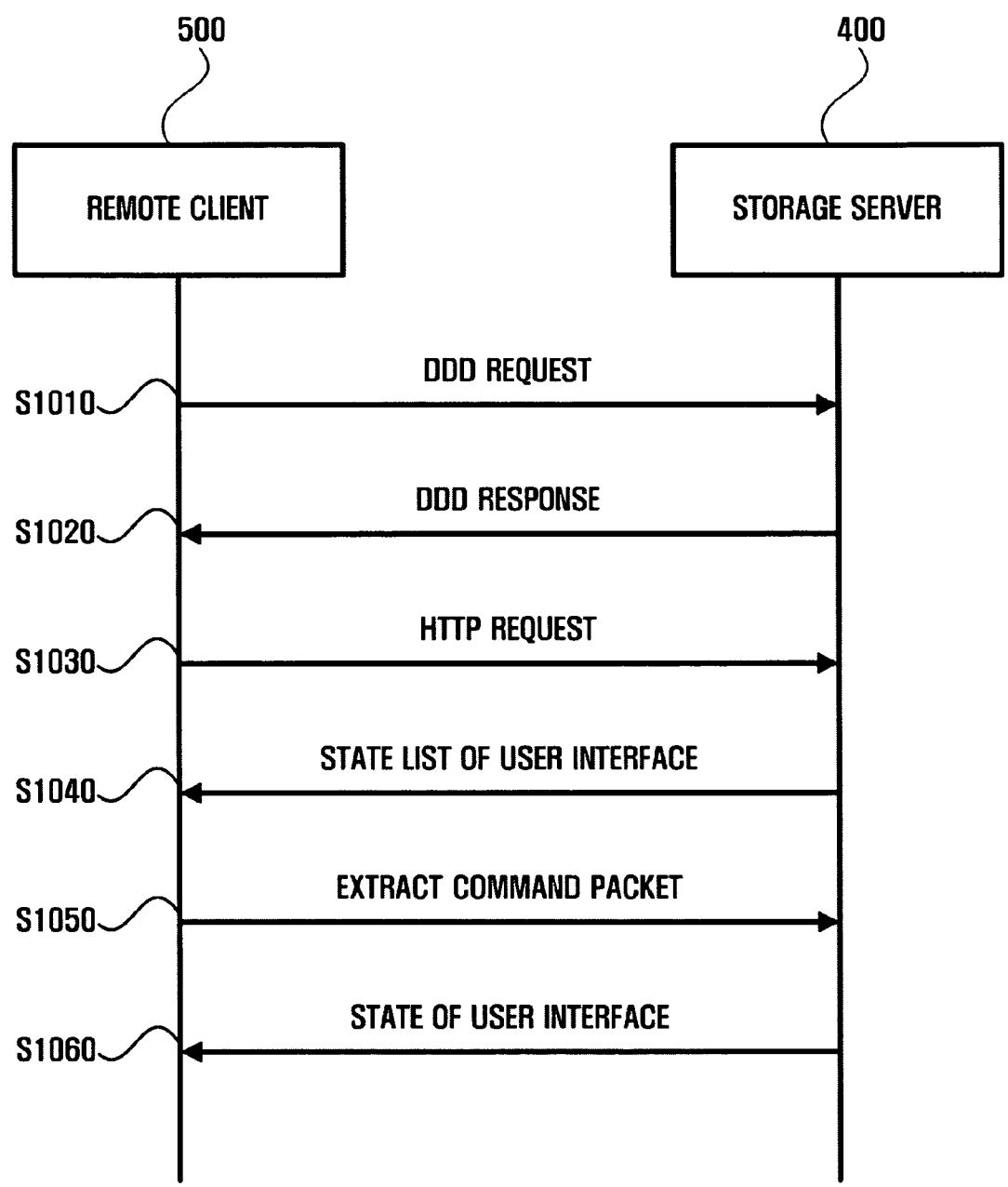
FIG. 10 is a flowchart illustrating a process of retrieving a state of a user interface according to an exemplary embodiment of the present invention.

FIG. 10 is a flowchart illustrating a process of retrieving a state of a user interface according to an exemplary embodiment of the present invention.

When the server retrieval unit 550 of a remote client 500 performs the role of a control point of the UPnP, and the control unit 430 and the packet generation unit 440 of a storage server 400 perform the role of a controlled device, UPnP communication between the remote client 500 and the storage server 400 can be performed.

A remote client 500 receives a notification packet through a discovery step with the storage server 400. By referring to an address included in the notification packet, the remote client 500 transmits a DDD request packet to the storage server 400 in operation S1010.

The storage server 400 receiving the DDD request packet transmits a DDD response packet to the remote client 500 in operation S102. Here, the DDD response packet includes a list of applications, and may also include the URL of the user interface in relation to each of the applications.

For example, the following XML codes may be interleaved into the DDD response packet.

```
<uilist xmlns="urn:schemas-upnp-org:remoteui:uilist-1-0"
xmlns:xsi="http://www.w3.org/2001/XMLSchema-instance"
xsi:schemaLocation="urn:schemas-upnp-org:remoteui:uilist-1-0
CompatibleUIs.xsd">
  <ui>
    <uiID>4560-9876-1265-8758</uiID>
    <name>Music player</name>
    <description>Music browsing and playback application</description>
    <iconList>...</iconList>
    <fork>true</fork>
    <lifetime>-1</lifetime>
    <protocol shortName="VNC">
```

-continued

```
<uri>http://192.168.0.2/SRH</uri>
<protocolInfo>...opaque...</protocolInfo>
</protocol>
</ui>
```

Here, http://192.168.0.2/SRH indicates a module of the storage server 400, in which states of the user interface are stored. That is, an address of the state storage unit 410 is stored.

Accordingly, the remote client 500 analyzes the received DDD response packet, updates cache information, and stores the updated cache information in the storage unit 520.

Then, according to a command input by the user to retrieve the state of a user interface, the remote client 500 extracts an address of the state storage unit 410 of the storage server 400 included in the cache information. By using the extracted address, the remote client 500 transmits an HTTP request packet in order to communicate with the storage server 400 in operation S1030.

Accordingly, the storage server 400 transmits an HTTP response packet S1040, into which is inserted a list on the state of the user interface in an HTML or extensible markup language (XML) format. That is to say, the hyperlink for the state of each user interface is included in the HTTP ACK packet. An example of the hyperlink is as follows:

```
<a href="http://RUIS-IP-ADDR:PORT/RESTORE?_name_='
EPG Saved 21th Oct 9:00AM'" onClick="javascript:savedStateHandler">
EPG Saved 21th Oct 9:00AM</a>
```

The HTML format list is output through the web browser 530 of the remote client 500, and the user selects a desired state of the user interface in the output list.

The packet, that is, the extract command packet 700B, into which the selection result is inserted, is transmitted to the storage server 400 in operation S1050. The storage server 400 extracts the state of the user interface included in the extract command packet 700B from the state storage unit 410 and transmits the state to the remote client 500 in operation S1060. The remote client 500 restores the user interface in relation to the application according to the received state of the user interface.

Figure 11:
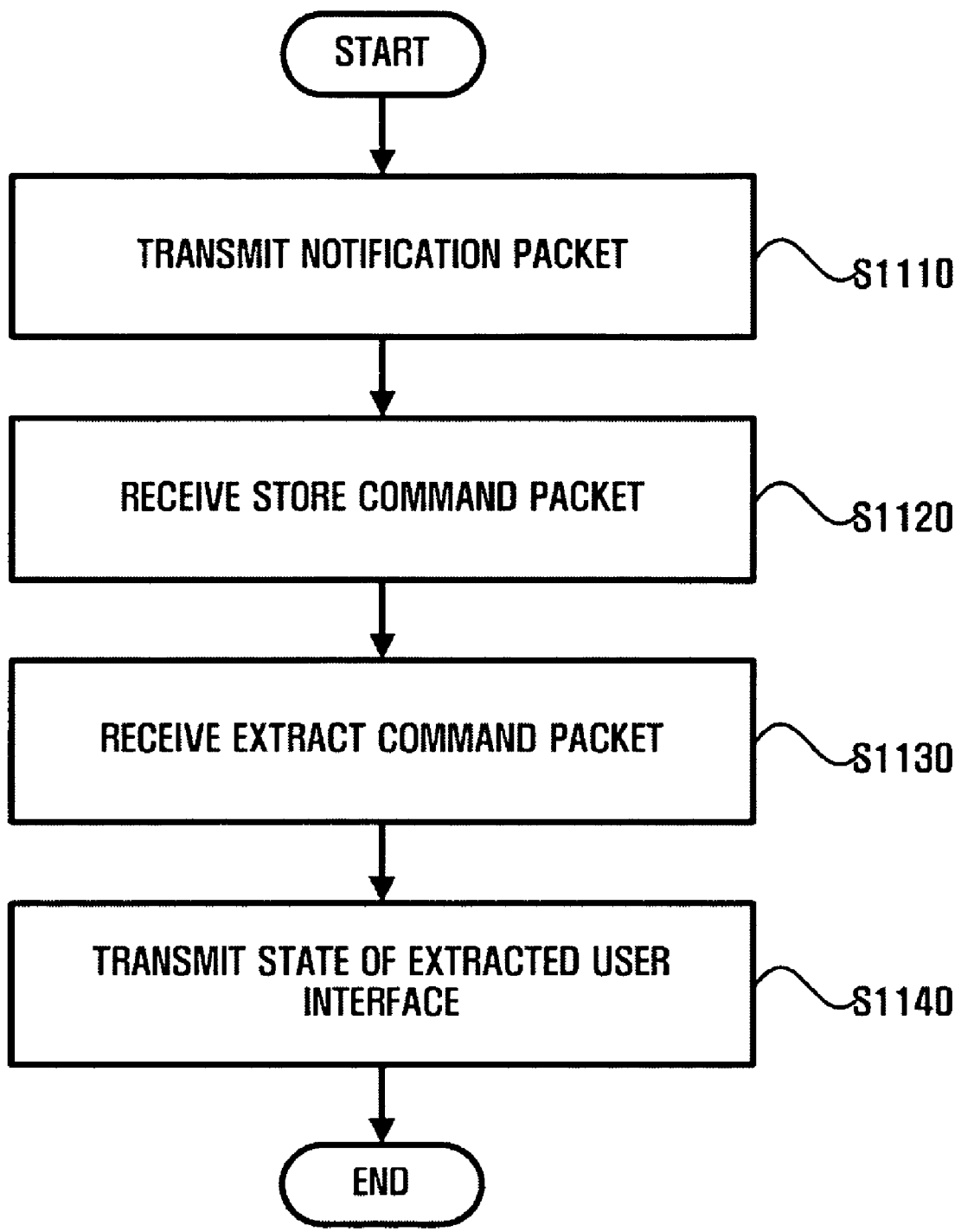
FIG. 11 is a flowchart illustrating a process of managing a state of a user interface according to an exemplary embodiment of the present invention.

FIG. 11 is a flowchart illustrating a process of managing a state of a user interface according to an exemplary embodiment of the present invention.

In order to manage the state of a user interface, the packet generation unit 440 of a storage server 400 generates a notification packet indicating that the storage server 400 exists on a network. The notification packet is periodically transmitted through the communication unit 450 in operation S1110, and as the notification packet is transmitted, the web server 420 performs communication with a remote client 500 through the communication unit 450.

Then, the web server 420 receives a store command packet 700A from the remote client 500 in operation S112. The state storage unit 410 stores the state of the user interface included in the received store command packet 700A. Here, the state of the user interface includes cookies of a web browser of the remote client 500, a form input, an audio/video object, and a URL of an application.

Then, the web server 420 receives an extract command packet 700B from the remote client 500 in operation S1130.

The control unit 430 searches the state storage unit 410 and extracts the state of the user interface included in the extract command packet 700B.

The extracted state of the user interface is transmitted to the remote client 500 through the communication unit 450 in operation S1140. Based on the extracted state, the remote client 500 displays the user interface in relation to the application desired to be restored.

FIG. 12 is a flowchart illustrating a process of receiving an application according to an exemplary embodiment of the present invention.

In order to restore an application provided by a remote server 300, the server retrieval unit 550 of a remote client 500 searches a storage server 400 capable of storing the state of the user interface in relation to the provided application in operation S1210. The server retrieval unit 550 analyzes a notification packet received through the communication unit 560 and determines whether or not the storage server 400 exists on the network.

If the retrieval result of the server retrieval unit 550 indicates that the storage server 400 exists on the network, the state management request unit 510 generates a store command packet 700A in relation to the state of the user interface according to the store command input of the user in operation S1220.

In order to generate the store command packet 700A, the state management request unit 510 collects the state of a user interface in relation to an application being currently operated. The state of the user interface includes a URL of the application, cookies of a web browser, a form input and an audio/video object. The store command packet 700A is transmitted to the storage server 400 through the communication unit 400 in operation S1230.

Here, the URL of the application may be supplied from the remote server 300. For example, a HTTP request packet including the following HTTP code may be transmitted to the remote server 300. http://192.168.1.1/EPG/record/GET-STATE In response to the HTTP request packet, the remote server 300 transmits a HTTP ACK packet to the remote client 500. The HTTP ACK packet may include the following HTTP code containing information regarding the application.

progid:123/recordStartTime:09\:00 AM/recordEndTime: 10\:00 AM/step:3

As the state of the remote server 300 is received, the state management requestor 510 may generate a record command packet 700a containing the following HTTP code.

```
_url1_http://192.168.1.1/EPG/record
url1.server=progid:123/recordStartTime:09\:00AM/
recordEndTime:10\:30AM/step:3
```

As the user inputs a restore command to restore the state of the user interface in operation S1240, the state management request unit 510 generates an extract command packet 700B in operation S1250. The generated extract command packet 700B is transmitted to the storage server 400 through the communication unit 560 in operation S1260.

As the extract command packet 700B is transmitted, the communication unit 560 receives the state of the user interface from the storage server 400 in operation S1270. The received state of the user interface is transferred to the web browser 530, and the web browser 530 displays the user interface in relation to a predetermined application according to the received state of the user interface in operation S1280.

As described above, the apparatus and method of providing a user interface of the exemplary embodiments of the present invention may provide the following advantages.

First, by storing the state of a user interface of an application provided by a server on a network in a separate device, an identical user interface can be provided to a user who receives the application through different clients.

Furthermore, user interfaces in relation to a plurality of applications provided by a plurality of servers existing on a network can be managed at the same time.

In concluding the detailed description, those skilled in the art will appreciate that many variations and modifications can be made to the exemplary embodiments without substantially departing from the principles of the present invention. Therefore, the disclosed exemplary embodiments of the invention are used in a generic and descriptive sense only and not for purposes of limitation.

What is claimed is:

1. An apparatus for managing a user interface, the apparatus comprising:
    a storage server comprising:
        a packet generation unit that generates a notification packet indicating that the storage server exists on a network;
        a web server that manages a store command for storing a state of a user interface of a predetermined application transmitted through the network and an extract command received as a result of distributing the notification packet;
        wherein the store command and the extract command are according to an input of a remote client,
        a state storage unit that stores the state of the user interface according to the store command; and
        a communication unit that transmits the state of a predetermined user interface extracted according to the extract command from the stored state of the user interface through communication with the remote client using hypertext markup language (HTML),
        wherein the state of the user interface comprises a state of the remote client and at least one of a state of a remote server providing the application,
        wherein the state of the remote client comprises at least one of a plurality of cookies of the web browser, a form input, and an audio/video object.

2. The apparatus of claim 1, wherein the network comprises a network using a hypertext transfer protocol (HTTP).

3. The apparatus of claim 1, wherein the communication unit transmits and receives the notification packet, the store command, the extract command or the state of the user interface formed using a hypertext markup language (HTML).

4. The apparatus of claim 1, wherein the state of the user interface comprises at least one of the state of a server providing the application and the state of a client receiving the application.

5. The apparatus of claim 1, further comprising an application generation unit that generates the application.

6. The apparatus according to claim 1, wherein the state of the user interface comprises at least one of a cookie of a web browser of the remote client, a form input, an audio/video object, a URL of an application and an address of the remote server.

7. The apparatus according to claim 1, wherein the web server provides an interface for storing and extracting the state of the user interface.

8. The apparatus according to claim 1, wherein the state storage unit stores a plurality of states of the user interface; and wherein the communication unit transmits the state of the predetermined user interface extracted according to the extract command from among the plurality of stored states of the user interface through communication with the remote client using an HTML format.

9. An apparatus for displaying a user interface comprising:
    a remote client including a computer processor, comprising:
        a server retrieval unit that searches a storage server storing a state of a user interface in relation to a provided application;
        a state management request unit that generates a packet for a store command and a packet for an extract command in relation to the state of the user interface according to the searching result;
        wherein the store command and the extract command are according to an input of the remote client,
        a communication unit that transmits the state of the user interface, the packet for the store command, or the packet for an extract command through communication with the storage server using HTML; and
        an application viewer that displays a predetermined user interface received in response to the transmission of the packet for the extract command;
        wherein the server retrieval unit analyzes a notification packet received through the communications unit and determines whether at least one of remote server or the storage server exists on the network,
        wherein the state of the user interface comprises a state of the remote client and at least one of a state of a remote server providing the application,
        wherein the state of the remote client comprises at least one of a plurality of cookies of the web browser, a form input, and an audio/video object.

10. The apparatus of claim 9, wherein the communication unit transmits the state of the user interface or the packet by using a hypertext transfer protocol (HTTP).

11. The apparatus of claim 9, wherein the communication unit transmits the packet or the state of the user interface formed using a hypertext markup language (HTML).

12. The apparatus of claim 9, wherein the state of the user interface comprises the state of a user interface in relation to one or more applications provided by one or more servers.

13. A method of managing a user interface comprising:
    generating a notification packet indicating that a storage server exists on a network;
    managing a store command of a state of a user interface of a predetermined application transmitted through the network and an extract command received as a result of distributing the notification packet;
    wherein the store command and the extract command are according to an input of a remote client,
    storing the state of the user interface according to the store command; and
    transmitting the state of a predetermined user interface extracted according to the extract command from the stored state of the user interface through communication with the remote client using HTML,
    wherein the state of the user interface comprises a state of the remote client and at least one of a state of a remote server providing the application,
    wherein the state of the remote client comprises at least one of a plurality of cookies of the web browser, a form input, and an audio/video object.

14. The method of claim 13, wherein the network comprises a network using a hypertext transfer protocol (HTTP).

15. The method of claim 13, wherein the transmitting of the state of the predetermined user interface comprises transmitting and receiving the notification packet, the store command, the extract command or the state of the user interface formed using a hypertext markup language (HTML).

16. The method of claim 13, wherein the state of the user interface comprises at least one of the state of a server providing the application and the state of a client receiving the application.

17. The method of claim 13, further comprising generating the application.

18. A method of displaying a user interface comprising:
searching a storage server storing a state of a user interface in relation to a provided application;
generating a packet for a store command and a packet for an extract command in relation to the state of the user interface according to the result of the searching;
wherein the store command and the extract command are according to an input of a remote client,
transmitting the state of the user interface, the packet for the store command, or the packet for an extract command through communication with the storage server using HTML; and
displaying a predetermined user interface received in response to the transmission of the packet for the extract command;
wherein the searching of said server comprises the steps of analyzing a notification packet received through transmitting the state of the user interface or packet and determining whether at least one of a remote server or the storage server exists on the network, wherein the state of the user interface comprises a state of the remote client and at least one of a state of a server providing the application,
wherein the state of the remote client comprises at least one of a plurality of cookies of the web browser, a form input, and an audio/video object.

19. The method of claim 18, wherein the transmitting of the state of the user interface or the packet comprises transmitting the state of the user interface or the packet using a hypertext transfer protocol (HTTP).

20. The method of claim 18, wherein the transmitting of the state of the user interface or the packet comprises transmitting the packet or the state of the user interface formed using a hypertext markup language (HTML).

21. The method of claim 18, wherein the state of the user interface comprises the state of a user interface in relation to one or more applications provided by one or more servers.

\* \* \* \* \*